(12) United States Patent
Kakinuma (10) Patent No.: US 6,267,578 B1
(45) Date of Patent: Jul. 31, 2001

(54) BONDED OPTICAL DISK WITH INTERNAL ABUTTING STRUCTURE TO CONTROL SPACING OF BONDED HALVES AND THICKNESS OF BOND LAYER

(75) Inventor: Keiji Kakinuma, Shizuoka (JP)

(73) Assignee: Toshiba-Emi Limited, Tokyo (JP)

( * ) Notice: Subject to any disclaimer, the term of this patent is extended or adjusted under 35 U.S.C. 154(b) by 0 days.

(21) Appl. No.: 09/428,050

(22) Filed: Oct. 27, 1999

Related U.S. Application Data (62) Division of application No. 08/937,786, filed on Sep. 24, 1997, now Pat. No. 6,078,561.

(30) Foreign Application Priority Data

Mar. 31, 1997 (JP) .................................................... 9-079798

(51) Int. Cl.[7] .................................................. G11B 7/26
(52) U.S. Cl. ........................................... 425/175; 425/810
(58) Field of Search .................................. 425/175, 810, 425/556, 437

(56) References Cited

U.S. PATENT DOCUMENTS

| | | | |
|---|---|---|---|
| 4,324,962 | 4/1982 | Dulen | 200/5 A |
| 4,353,767 | 10/1982 | Wilkinson | 156/245 |
| 4,684,767 | 8/1987 | Phalen | 200/5 A |
| 4,739,345 | 4/1988 | Namba et al. | 369/283 |
| 4,767,486 * | 8/1988 | Nakajima et al. | 425/810 |
| 4,915,997 | 4/1990 | Yamamuro et al. | 369/284 |
| 5,117,409 | 5/1992 | Shimizu et al. | 369/36 |
| 5,136,563 | 8/1992 | Takemasa et al. | 369/36 |
| 5,305,304 | 4/1994 | Hayashi | 369/275.5 |
| 5,481,512 | 1/1996 | Morioka et al. | 369/36 |
| 5,536,456 * | 7/1996 | Kuwahara et al. | 425/810 |
| 5,638,347 | 6/1997 | Baca et al. | 369/34 |
| 5,681,634 | 10/1997 | Miyamoto et al. | 428/64.6 |
| 5,718,960 | 2/1998 | Asai | 428/64.1 |
| 5,759,332 | 5/1996 | Itoigawa et al. | 369/286 |
| 5,852,329 * | 12/1998 | Arakawa et al. | 425/542 |
| 5,956,317 * | 9/1999 | Komiyama et al. | 369/286 |
| 6,039,898 * | 3/2000 | Glushko | 425/810 |

FOREIGN PATENT DOCUMENTS

| | | |
|---|---|---|
| 0 732 691 | 9/1996 | (EP) . |
| 0 756 274 | 1/1997 | (EP) . |
| 5-20714 | 1/1993 | (JP) . |
| 7-21722 | 1/1995 | (JP) . |
| 8-212667 | 8/1996 | (JP) . |
| 9-81964 | 3/1997 | (JP) . |

* cited by examiner

Primary Examiner—Blaine Copenheaver
Assistant Examiner—Thu Khanh T. Nguyen
(74) Attorney, Agent, or Firm—McDermott, Will & Emery (57) ABSTRACT

In a bonded optical disk comprising two base disks which are bonded together by UV-setting adhesive, one or two of the base disks are provided with a projection located inside the adhesive application starting position in order to maintain the distance between bonded surfaces of the base disks at a predetermined thickness for the adhesive layer. A mold for molding above base disks is also provided. The thickness of the UV-setting adhesive is easily held at a predetermined thickness by the projection located inside the starting position. Therefore steady mass production of bonded optical disks with uniform adhesive layer thickness is made possible with easier management of the adhesive layer thickness.

1 Claim, 6 Drawing Sheets

BONDED OPTICAL DISK WITH INTERNAL ABUTTING STRUCTURE TO CONTROL SPACING OF BONDED HALVES AND THICKNESS OF BOND LAYER

This application is a divisional of application Ser. No. 08/937,786 filed Sep. 24, 1997 now U.S. Pat. No. 6,078,561 filed Jun. 20, 2000.

BACKGROUND OF THE INVENTION

1. Field of the Invention

The present invention relates to a bonded optical disk used to record or play back audio/video information or general data optically, and a mold for molding base disks composing the bonded optical disk.

2. Description of the Prior Art

Bonded optical disks such as DVDs which are comprised of two base disks bonded together are well known today. As DVDs, so-called 'single sided single layer' type bonded optical disk and so-called 'double sided single layer' type bonded optical disk are known.

The 'single sided single layer' type disk is comprised of a recording base disk for recording information and a dummy base disk for printing a label, both of which being bonded together, and recorded information on the recording base disk is read out from one side i.e. the surface of the recording base disk.

The 'double sided single layer' type disk is comprised of two recording base disks bonded together, and recorded information on each recording base disk is read out from both sides of the bonded optical disk.

In order to produce a bonded optical disk such as a DVD, a transparent disk base of polycarbonate etc. with plenty of information pits is generally prepared first by injection molding.

For production of the 'double sided single layer' type bonded optical disk, a single disk for the recording base disk of one side is prepared next by metallizing a reflection film of aluminum etc. on the surface of the pits of the molded disk base by sputtering etc.. Then, as disclosed in JP-A-5-20714, ultra violet ray setting resin(UV-setting resin) is applied in the shape of a doughnut on the reflection film on the single disk, and another single disk is put upon this to bond them together. These single disks get bonded together by so-called spinner treatment in which the disks are spinned and the UV-setting adhesive spreads all over the surfaces of the disks. At this stage, ultraviolet rays are irradiated from one side or both sides of the bonded disk and the adhesive is hardened and set. Incidentally, for the 'single sided single layer' type bonded optical disk, the reflection film is not needed to be metallized on the dummy base disk.

There exists another type of bonded optical disk which is so-called 'single sided dual layer' type bonded optical disk. This disk is comprised of a transparent base disk on which semitransparent film is metallized and a recording base disk on which a reflection film of aluminum etc. is metallized, and both base disks are bonded together. Recorded information on two layers is read out form the side of the base disk with semitransparent film. This 'single sided dual layer' type bonded optical disk is produced by similar process to the process described above.

For these types of bonded optical disks, a strict standard is established as to the 'tilt' which indicates the warp angle of recording area from the held part of the disk (angle $\alpha \leq \pm 0.8°$).

However, the direction and the amount of the warp vary widely between base disks which are supposed to be bonded together, according to sectional structure and molding condition (residual stress etc.) of the base disks.

Since it is substantially impossible to bond two base disks having exactly the same amount and the opposite direction of warps, produced bonded optical disks are forced to have not a little 'tilt' caused by the difference of the warps. Therefore, it has been impossible to steadily mass produce and supply bonded optical disks with minimum tilts.

Moreover, there exists another standard for the 'single sided dual layer' type bonded optical disks as to the thickness of adhesive layer bonding two base disks (40–70 $\mu$m, ±10 $\mu$m within one disk, ±4 $\mu$m within one revolution). Hence, in the conventional spinner application process, thickness of the adhesive layer has to be controlled by varying spinning speed and time according to the viscosity of UV-setting adhesive. However, the viscosity of this UV-setting adhesive tends to vary according to temperature and surface tension on base disks, requiring strict management of these parameters in the thickness control of the adhesive layer. Therefore, it has been impossible to steadily mass produce and supply bonded optical disks with uniform adhesive layer thickness between base disks.

SUMMARY OF THE INVENTION

It is therefore an object of the present invention to provide a bonded optical disk and a mold thereof by which the thickness of adhesive layer between base disks is easily uniformed and thereby steady mass production of bonded optical disks with uniform adhesive layer thickness is made possible.

It is another object of the present invention to provide a bonded optical disk and a mold thereof by which steady mass production of bonded optical disks with sufficiently small tilt is made possible.

In order to attain the above object, there is provided a bonded optical disk comprising two base disks which are bonded together by UV-setting adhesive between them, wherein one or two of the base disks are provided with a projection located inside the adhesive application starting position in order to maintain the distance between bonded surfaces of the base disks at a predetermined thickness for the adhesive layer.

In this configuration, a bonded optical disk which can easily manage the thickness of the bonding layer can be obtained.

Preferably, the projection is located in a position corresponding to the held part of the bonded optical disk.

In this configuration, a bonded optical disk in which tilt angle at the held part is minimized can be obtained.

Preferably, a stamper clamp groove of the base disk is provided adjacent to the center hole of the base disk, and the projection is formed adjacent to the circumference of the stamper clamp groove.

In this configuration, a bonded optical disk in which the tilt angle caused by the stamper clamp groove is minimized can be obtained.

Preferably, the projection is composed of a spacer or a paint layer.

In this configuration, the thickness of the UV-setting adhesive is easily held at a predetermined thickness by the spacer or the paint layer, with minimum need for modifying conventional molds.

According to another aspect of the present invention, there is provided a mold used for molding a base disk:

composing a bonded optical disk which is comprised of two base disks bonded together by UV-setting adhesive, wherein the mold is provided with a concavity for forming a projection on the base disk inside the adhesive application starting position in order to maintain the distance between bonded surfaces of the base disks at a predetermined thickness for the adhesive layer.

In this configuration, a mold used for molding a base disk composing a bonded optical disk which can easily manage the thickness of the bonding layer.

Preferably, the projection formed by the mold is located in a position corresponding to the held part of the bonded optical disk.

In this configuration, a mold used for molding a base disk composing a bonded optical disk in which tilt angle at the held part is minimized can be obtained.

Preferably, a stamper clamp groove of the base disk is provided adjacent to the center hole of the base disk, and the projection is formed adjacent to the circumference of the stamper clamp groove.

In this configuration, a mold used for molding a base disk composing a bonded optical disk in which the tilt angle caused by the stamper clamp groove is minimized can be obtained.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

The present invention will now be described in connection with its preferred embodiments with reference to the accompanying drawings, wherein like reference characters designate like or corresponding parts throughout the views and thus repeated description thereof is omitted for brevity.

Figure 1:
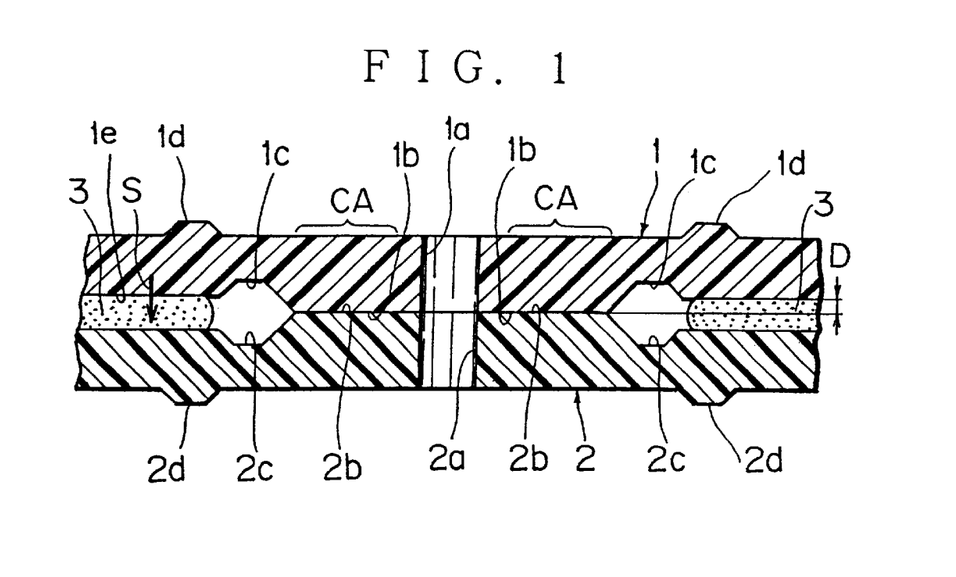
FIG. 1 is a sectional view of a bonded optical disk according to the first embodiment of the present invention.

FIG. 1 shows a vertical section of a bonded optical disk according to the first embodiment of the present invention. In FIG. 1, the bonded optical disk comprises two base disks 1 and 2 which are bonded together by UV-setting adhesive 3 between them by means of spinner application. The base disks 1 and 2 are provided with an annular projection or plateau 1b and 2b at least in a part inside the starting position S for adhesive application in order to hold the distance between two base disks 1 and 2 at a predetermined thickness of adhesive layer.

These annular projections are formed to make a difference D in level between the surface 1e corresponding to a recording area or the opposite surface to the recording area and the surface opposite to the held part CA of the disk.

As mentioned above, the thickness of the adhesive layer is regulated to be 40–70 μm ±10 μm within one disk, and ±4 μm within one revolution for DVDs, especially to the 'single sided dual layer' type DVDs.

Afore-mentioned predetermined thickness of the adhesive layer tends to be thicker in the outer part when applied by spinner application, and according to our experiments, the optimum value of the sum of Ds of the two base disks was 40–50 μm. Especially, it is the most preferable for making tilt angle small when the annular projections 1b and 2b of the two base disks 1 and 2 have the same height.

Moreover, since the annular projections 1b and 2b are provided in the part corresponding to the held part CA in this embodiment, the tilt angle at the held part CA can be minimized.

Figures 10A, 10B, 10C:
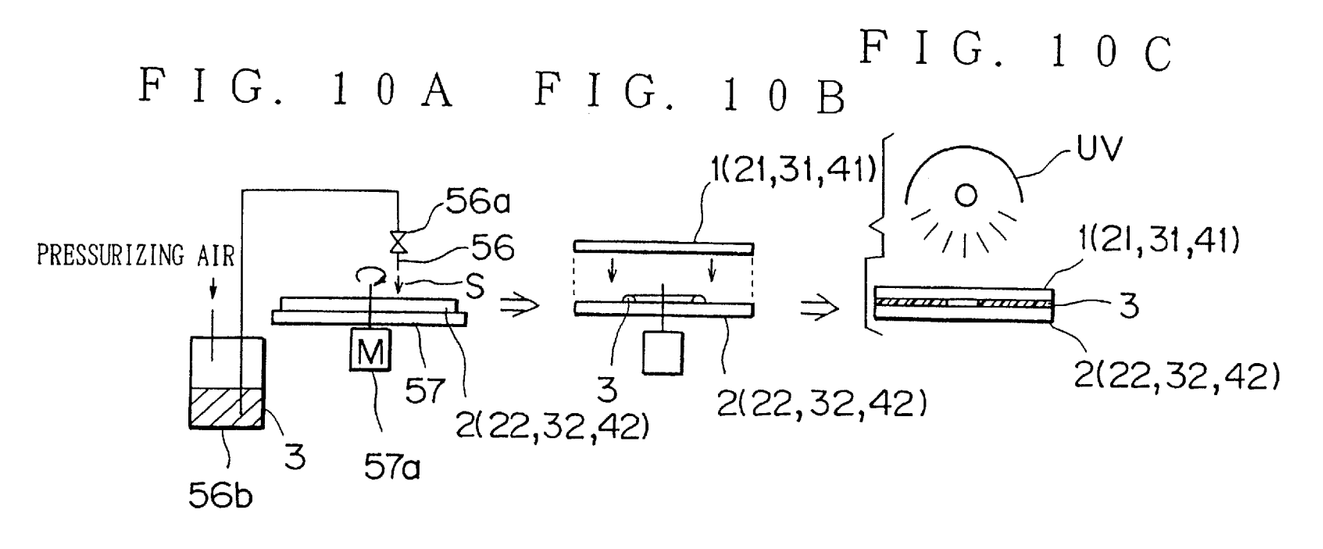
FIGS. 10A to 10C are schematic views showing a spinner application method.

Now, FIG. 10A shows a spinner application apparatus for spinner application of the UV-setting adhesive. The lower base disk 2 is set on an index table 57 for printing paint layer and spinned by a motor 57a. Subsequently, a valve 56a is opened and UV-setting resin 3 in a pressurized tank 56b drops down through a nozzle 56 on the starting position S for adhesive application on the lower base disk 2, and the resin 3 is applied in the shape of a ring.

The base disk 1 is then set upon the UV-setting resin 3 applied in the shape of a ring as shown in FIG. 10B, and the UV-setting resin 3 is spread by full-spinning the disks. Then the UV-setting resin 3 is hardened and set by irradiation of ultraviolet rays as shown in FIG. 10C.

Figure 2:
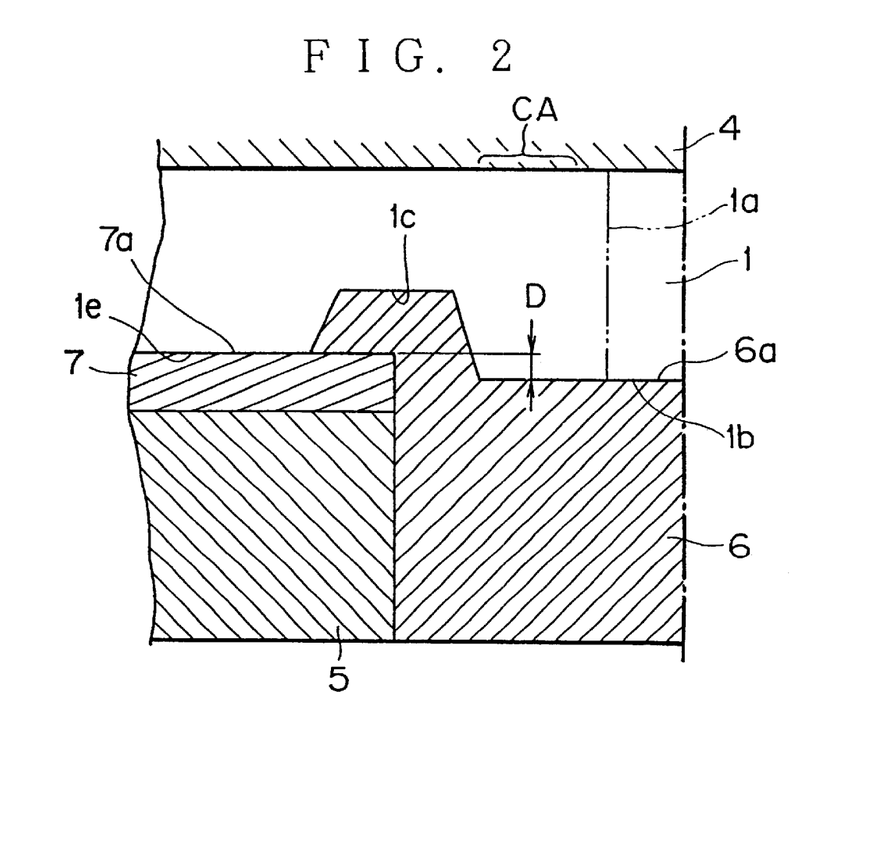
FIG. 2 is a sectional view of a mold used for molding a base disk composing a bonded optical disk of the first embodiment.

FIG. 2 shows a mold used for molding a base disk composing a bonded optical disk of the first embodiment. In FIG. 2 etc., reference numeral '1a' designates the line along which a center hole is to cut off. This mold comprises a fixed mold 4, a movable mold 5, and a stamper installer 6 for installing a stamper 7 on the movable mold 5. The stamper 7 is installed on the movable mold 5 by the stamper installer 6. This stamper installer 6 is formed so that the height of the part corresponding to the held part CA of the molded base disk 1 (or 2) i.e. a molding surface 6a inside a stamper clamp groove 1c will be lower than a molding surface 7a outside the stamper clamp groove 1c by 20–25 μm.

Therefore, the part corresponding and opposite to the held part CA of the base disk 1 (or 2) molded by this mold is formed higher by 20–25 μm. When such molded base disks are bonded together, a gap 40–50 μm is formed between the molded base disks 1 and 2 outside the part corresponding to the held part CA. The width of this gap decides the thickness of the adhesive layer.

Incidentally, though there has been described in the first embodiment a recording base disk in which the molding surface 7a which molds the part of the base disk outside the stamper clamp groove 1c was on the stamper 7, for molding dummy base disks without recording area, such as the 'single sided single layer' type bonded optical disks, another type of mold without the stamper 7 can be used in which the stamper installer 6 and a movable mold with a molding surface higher than that of the surface of the movable mold 5 in FIG. 2 are formed together.

The first embodiment described above is not the most preferable to make the tilt angle small, since the stamper clamp groove 1c is located outside the annular projection 1b deciding the gap D i.e. outside the held part CA. Therefore another embodiment is described next in which the tilt can be reduced.

Figure 3:
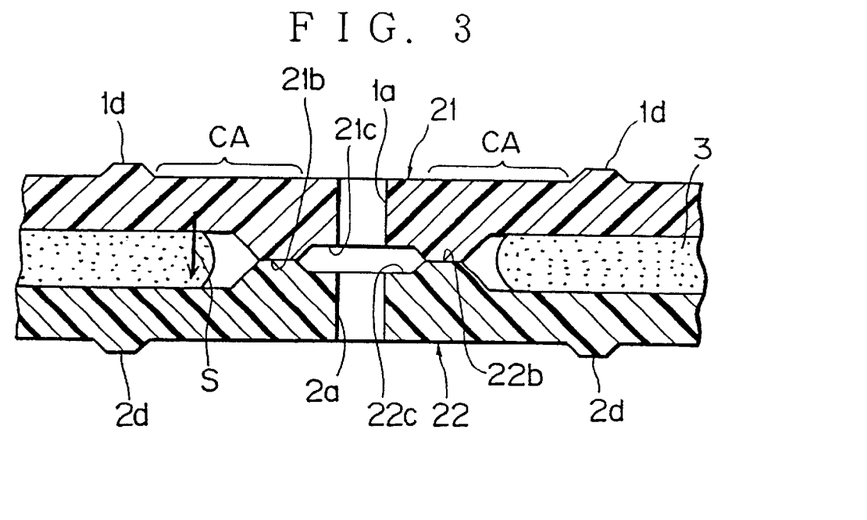
FIG. 3 is a sectional view of a bonded optical disk according to the second embodiment of the present invention.

FIG. 3 shows a vertical section of a bonded optical disk according to the second embodiment of the present invention. As shown in FIG. 3, in the bonded optical disk of the second embodiment, stamper clamp grooves 21c and 22c of a pair of base disks 21 and 22 are located adjacent to center holes 1a and 2a of the base disks 21 and 22 respectively. The annular projections 21b and 22b are formed adjacent to the circumferences of the stamper clamp grooves 21c and 22c respectively. This bonded optical disk is advantageous for reducing the tilt since the stamper clamp grooves 21c and 22c are located adjacent to center holes 1a and 2a.

As described above, in the bonded optical disk of the second embodiment, the stamper clamp grooves 21c and 22c could be located adjacent to center holes 1a and 2a of the base disks 21 and 22 by forming the annular projections 21b and 22b adjacent to the circumferences of the stamper clamp grooves 21c and 22c, whereby the tilt caused by warps of the base disks 21 and 22 can be reduced.

Figure 4:
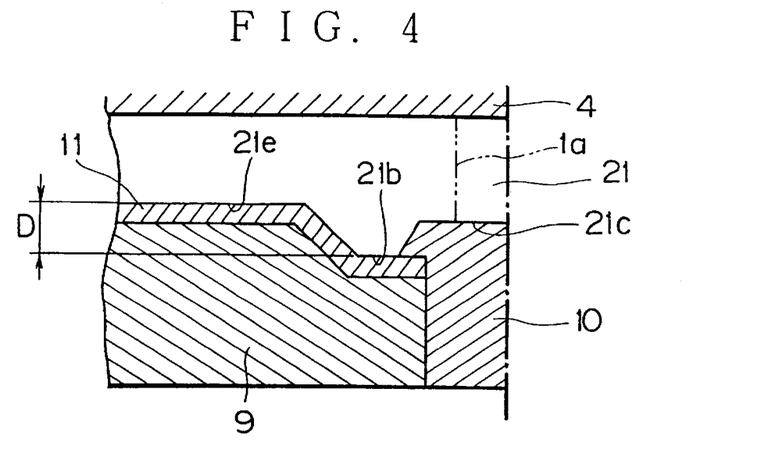
FIG. 4 is a sectional view of a mold used for molding a base disk composing a bonded optical disk of the second embodiment.
Figure 5A:
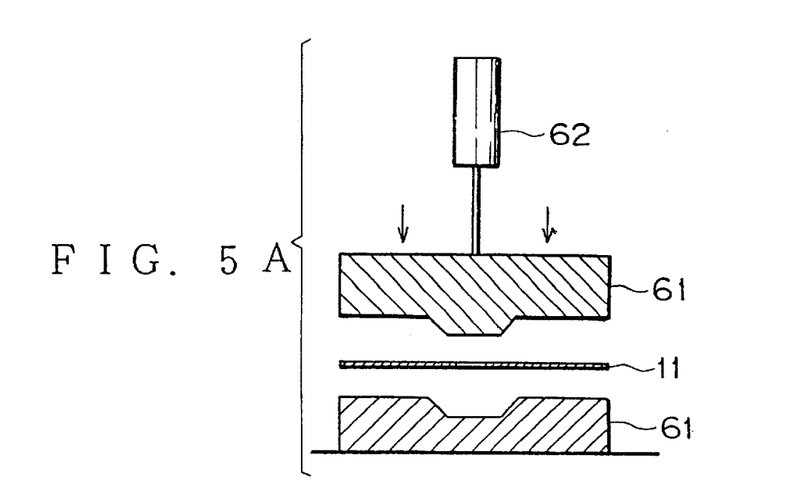
FIGS. 5A and 5B are schematic views explaining preparation of a stamper.
Figure 5B:
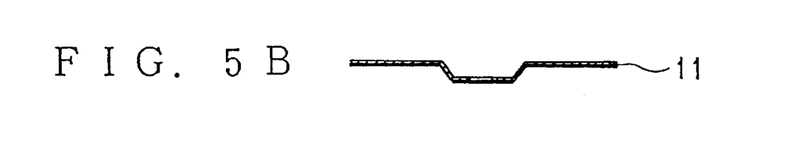

Next, FIG. 4 shows a mold used for molding a base disk composing a bonded optical disk of the second embodiment. As shown in FIG. 4, the mold is provided with a level difference D in a movable mold 9 and a stamper 11, thereby making the height of the annular projections 21b from an information recording surface 21e of the base disk 20–25 $\mu$m. In order to provide the level difference D in the stamper 11, the stamper 11 is placed between embossing molds 61,61 and pressed by a pressurizing cylinder 62 as shown in FIG. 5A, then the stamper 11 with the level difference D is obtained as shown in FIG. 5B. It should be noted that the same result can be obtained by molding the fixed mold with the stamper 7 installed or the movable mold with no stamper.

Incidentally, though the annular projections were formed on both base disks of the bonded optical disk in the first and the second embodiment, the level difference D by the annular projection may as well be provided only one projection on a base disk of one side. And in the case where the projections are provided on both base disks, the level differences D may be either the same or different between two base disks. The Ds may be optionally set so that the sum of two Ds will be between 40–50 $\mu$m. However, setting the same Ds is the most preferable for making the tilt small.

Figure 6A:
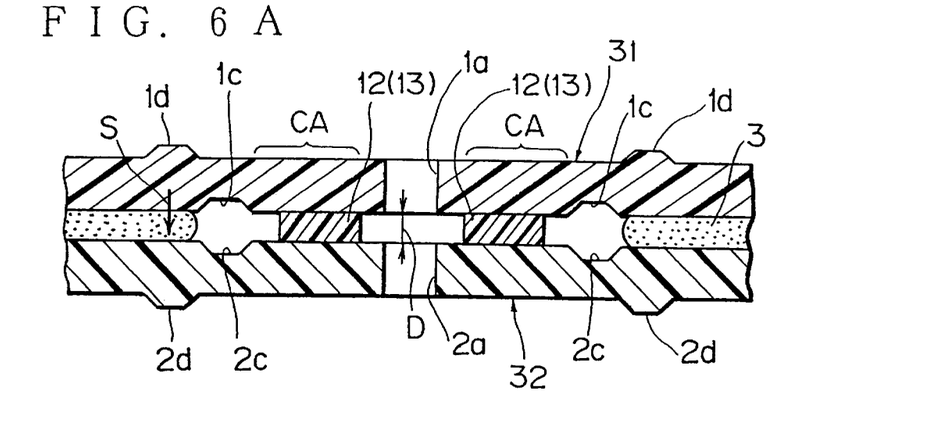
FIGS. 6A and 6B are sectional views of bonded optical disks according to the third and the fourth embodiment respectively.
Figure 6B:
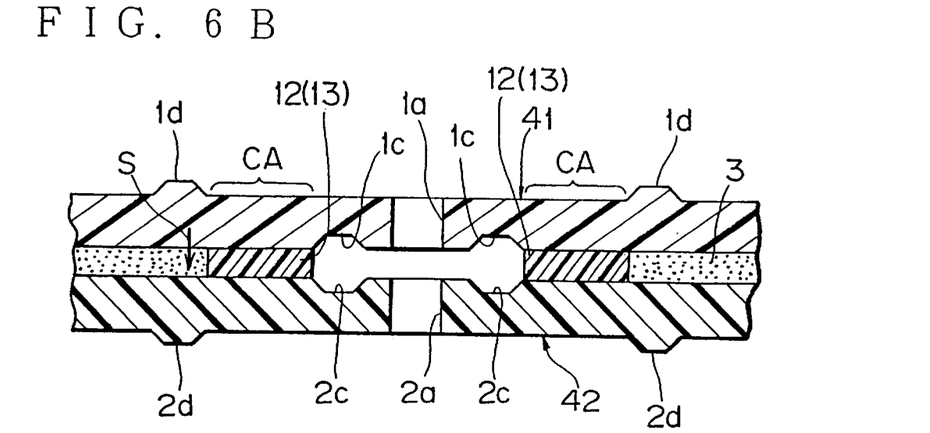

Next, FIGS. 6A and 6B shows vertical cross sections of bonded optical disks according to the third and the fourth embodiment of the present invention, respectively.

In FIG. 6A showing the third embodiment, one or two paint layers 12(13) by printing etc. are provided on one or two of base disks 31,32 prepared by conventional molding process i.e. base disks 31,32 without annular projections or level differences. The paint layers are provided before the UV-setting adhesive 3 is applied and two base disks are bonded together. Of course, the paint layer 12(13) forming an annular projection may be provided either on one base disk or on both base disks. According to the above configuration, the paint layer 12 (13) providing the level difference D makes it possible to hold the thickness of the UV-setting adhesive 3 at a predetermined thickness.

Another construction is also possible. In FIG. 6B showing the fourth embodiment, the stamper clamp grooves 1c and 2c are located near the center holes 1a and 2a respectively, and the paint layers 12(13) are formed outside the stamper clamp grooves 1c and 2c. In this case, the stamper clamp grooves 1c and 2c can be located near the center holes 1a and 2a respectively and hence inside the held part CA, therefore this structure is advantageous for reducing the tilt.

Figure 7A:
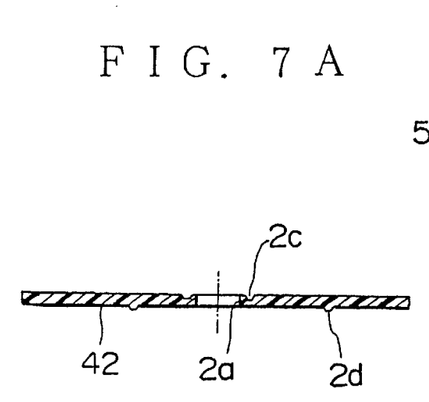
FIGS. 7A to 7C are schematic views showing the bonding process of the bonded optical disk according to the fourth embodiment shown in FIG. 6B in order of steps.
Figure 7B:
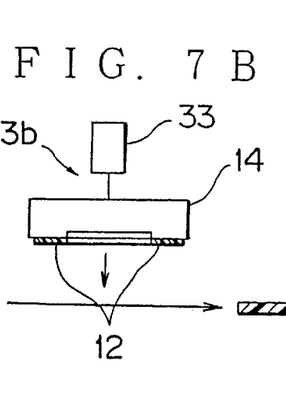
Figure 7C:
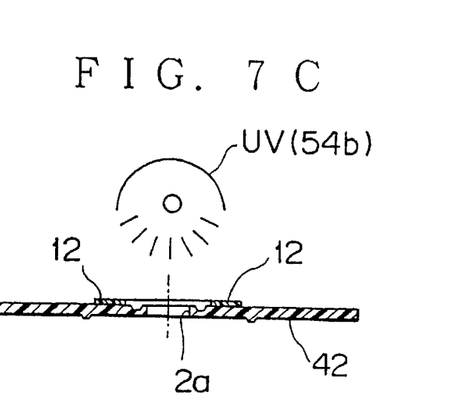

FIGS. 7A to 7C show an example of a method for forming the paint layer 12 in the fourth embodiment in order of steps. Specifically, FIG. 7A shows a base disk 42 before application of the paint layer 12; FIG. 7B shows a printing process, and FIG. 7C shows a UV curing process.

As shown in FIGS. 7A to 7C, the base disk 42 is conveyed with its stamper clamp groove 2c formed by the stamper installer facing upward and reaches a position below a stamp 14. Then by the movement of pressurizing cylinder 33, a paint such as UV-setting resin on the stamp 14 is applied onto the base disk 42 around the center hole 2a. Subsequently, the paint layer 12 applied to the base disk 42 is cured and set by an ultraviolet ray lamp. Incidentally, the paint layer 12 in the third embodiment shown in FIG. 6A can be provided in the same way.

Figure 8:
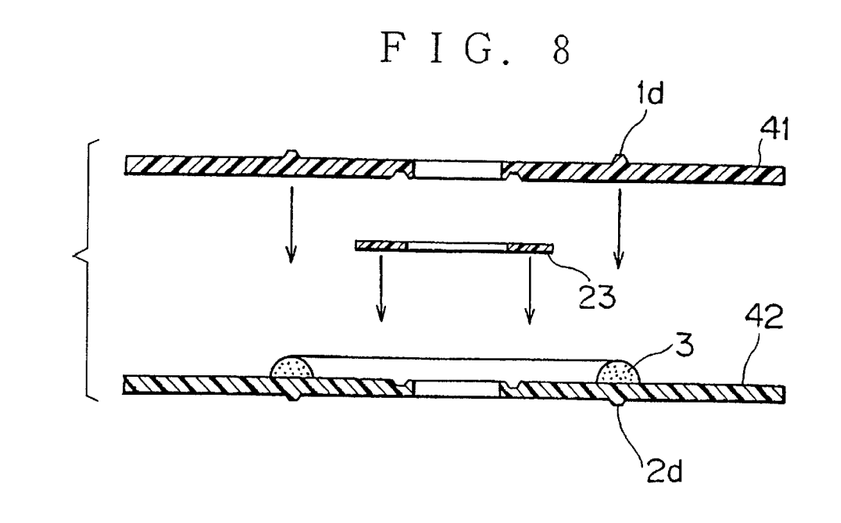
FIG. 8 is an exploded view showing another method for bonding together the two base disks of the third or the fourth embodiment of the present invention.

FIG. 8 shows another method for bonding together the two base disks of the third or the fourth embodiment. In this method, a spacer 23, instead of the paint layer 12 of the third and the forth embodiment, is placed between a pair of base disks 41,42 to form an annular projection. And the base disks are bonded together with the UV-setting resin 3 in contact with the spacer 23. For this spacer 23, metal foil can be utilized for example. It is possible to hold the thickness of the adhesive layer at a predetermined thickness by the spacer 23 in the same way as the paint layer 12.

Figure 9:
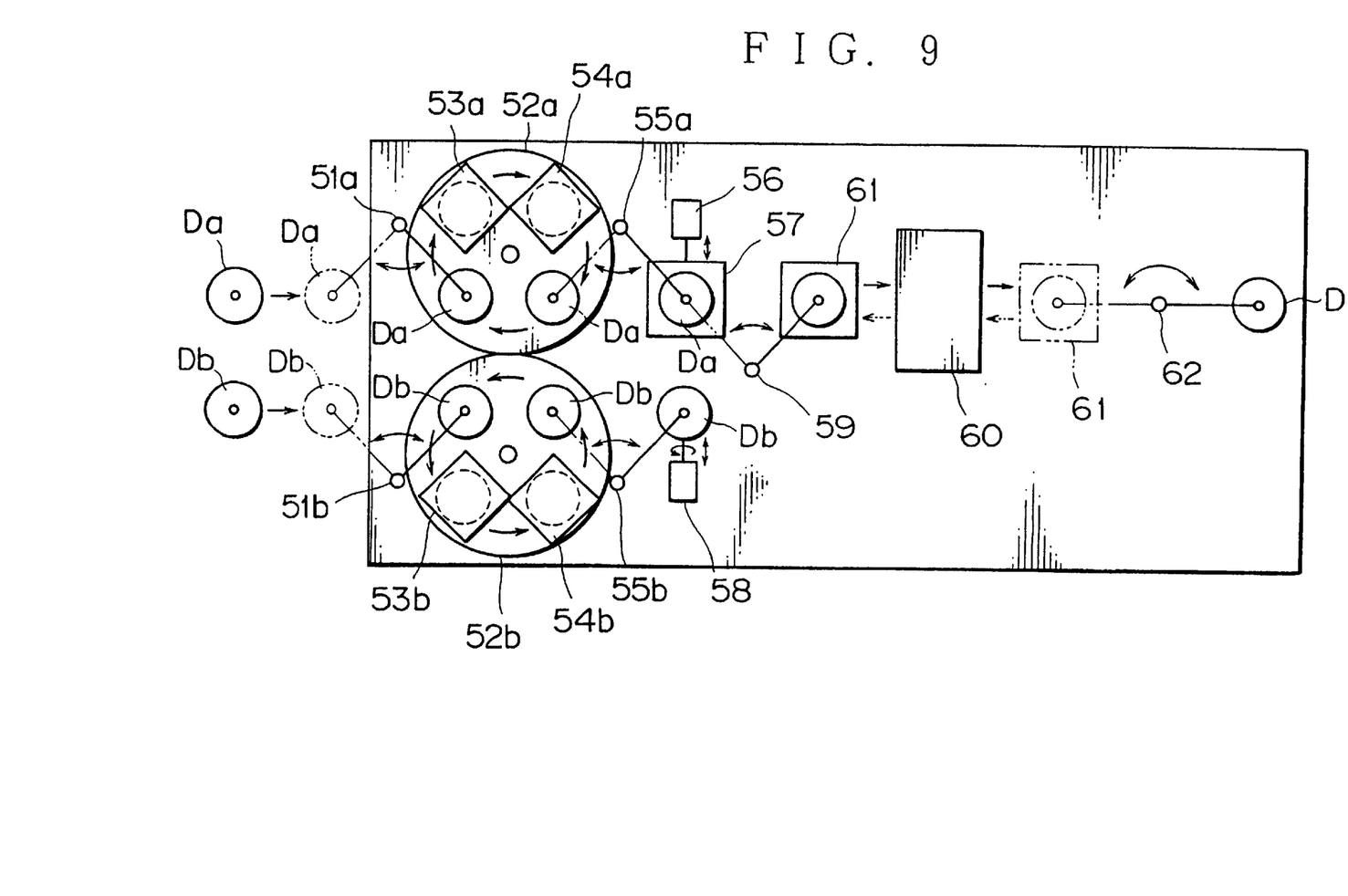
FIG. 9 is a schematic plan view showing the construction of a bonding apparatus used for producing a bonded optical disk according to the present invention.

Now, FIG. 9 is a schematic plan view showing the construction of a bonding apparatus used for producing a bonded optical disk according to the third and the fourth embodiment. In FIG. 9, the reference letter 'Da' denotes a base disk for one side before bonding together (the base disk 31 or 41), 'Db' denotes another base disk for another side before bonding together (the base disk 32 or 42), and 'D' denotes a completed bonded optical disk after bonding the base disk Da and Db together. The base disks Da and Db have a sectional configuration shown in FIG. 6. Incidentally, in the following (in FIG. 9), components with the letter 'a' or 'b' are components for producing base disk Da or Db respectively.

As shown in FIG. 9, the apparatus comprises disk transfer arms 51a and 51b for carrying base disks in, index tables 52a and 52b for printing paint layers, screen printing sections 53a and 53b, UV curing sections 54a and 54b, disk transfer arms 55a and 55b, a nozzle section 56 for applying liquid state UV-setting adhesive on the base disk Da, an application table 57, a disk inverter 58, a disk transfer arm 59, a UV lamp 60, a conveying table 61 for conveying disks under the UV lamp 60, and a transfer arm 62 for carrying bonded optical disks out.

The base disks Da,Db are set on stands(not shown) and sent to the positions of the disk transfer arms 51a,51b respectively. Subsequently, the base disks Da,Db are transferred and set on the index tables 52a,52b by the disk transfer arms 51a,51b respectively.

The index table 52a is rotated in the direction of arrows at predetermined intervals and by pitches. The base disk Da set on the index table 52a is sent to the screen printing section 53a, then the screen printing section 53a screen prints the paint layer 12 of UV-setting resin on the upper surface of the base disk Da. Subsequently, the base disk Da is cured by ultraviolet rays in the UV curing section 54a and the printed paint is cured and set.

Likewise, the index table 52b is rotated in the direction of arrows at predetermined intervals and by pitches. The base disk Db set on the index table 52b is sent to the screen printing section 53b, then the screen printing section 53b screen prints the paint layer 13 of UV-setting resin on the upper surface of the base disk Db. Subsequently, the base disk Db is irradiated with ultraviolet rays in the UV curing section 54b and the printed paint is cured and set.

The base disk Da in which paint curing is completed is transferred onto the spinner 57 which is also shown in FIG. 10 by the disk transfer arm 55a, and the base disk Db for the other side is transferred to the disk inverter 58 by the disk transfer arm 55b.

Subsequently, liquid state UV-setting adhesive 3(see FIG. 6 etc.) is applied onto the base disk Da by the nozzle section 56. Meanwhile, the base disk Db is inverted by the disk inverter 58 turning the surface of the applied paint layer 12 downward, and then put upon the base disk Da on the application table 57.

The base disks Da,Db put together on the application table 57 are transferred onto the conveying table 61 by the disk transfer arm 59 and conveyed to the position under the UV lamp 60 by the conveying table 61, then ultraviolet rays are radiated and the two base disks Da,Db get bonded together completely. The completed bonded optical disk D is carried out by the transfer arm 62 and sent to succeeding processes (inspection processes etc.).

Incidentally, the bonded optical disks according to the first or the second embodiment can be produced using similar apparatus, however, index tables 52a and 52b in FIG. 9 are of course unnecessary.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A mold used for molding a pair of base disks, each disk having a center hole, the disks being bonded together by a UV-setting adhesive layer, the mold comprises:

a concavity having a flat bottom surface which forms a flat surface projection on the base disk;

a stamper on one side of the concavity having an flat surface forming an adhesive bonding surface for the base disk; and a flat surface on the opposite side of the concavity at a level between the bottom surface of the concavity and the flat surface of the stamper, wherein when the flat surface projection of one base disk is engaged with a corresponding flat surface on a corresponding projection of another base disk, an annular stamper clamp groove is formed adjacent to the projections and the center hole formed by the pairing of the disks and a level distance between the bonded surfaces of the base disks is maintained for controlling the thickness of the adhesive layer at a substantially constant value between the two base disks.

* * * * *